J. Maerhoffer,
Cider Press.
No. 90,672
Patented June 1, 1869.
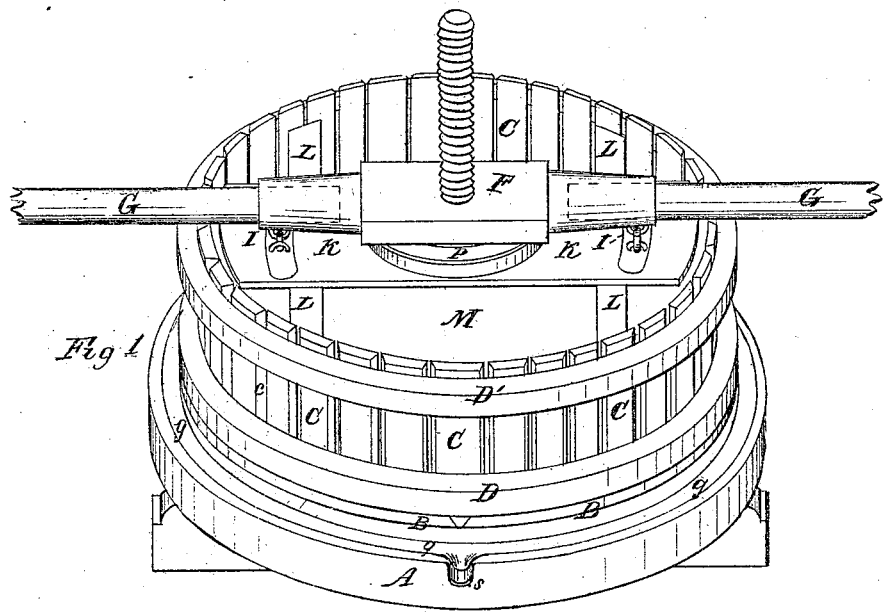
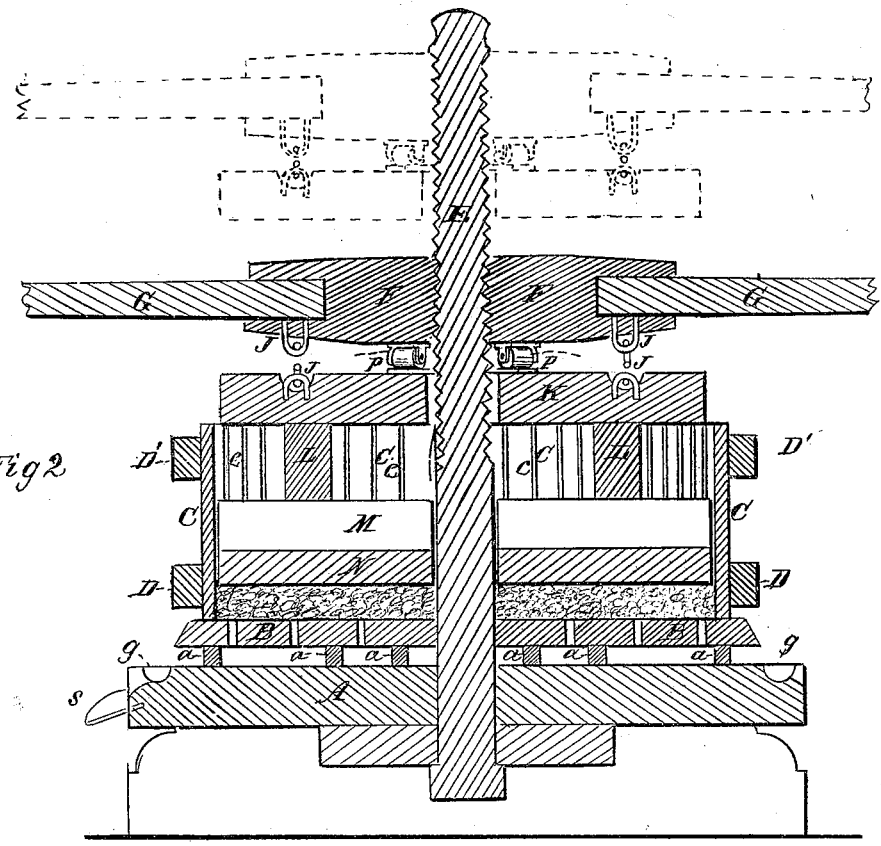

United States Patent Office.

JACOB MAERHOFFER, OF BOONVILLE, MISSOURI.

*Letters Patent No. 90,672, dated June 1, 1869.*

---

IMPROVED CIDER-PRESS.

---

The Schedule referred to in these Letters Patent and making part of the same.

---

*To all whom it may concern:*

Be it known that I, JACOB MAERHOFFER, of Boonville, in the county of Cooper, and State of Missouri, have invented a new and useful Wine or Cider-Press; and I do hereby declare that the following is a full, clear, and exact description thereof, reference being had to the accompanying drawings, in which—

Figure 1 is a perspective view of my invention, and

Figure 2 is a central vertical section.

The nature of my invention consists in a peculiar arrangement and combination of parts, in a wine or cider-press, for facilitating the operation of filling and replenishing the vat, and pressing the fruit, or other substance contained in the vat.

To enable those skilled in the art to which my invention appertains, to make and use the same, I will proceed to describe its construction and operation.

In the drawings—

In the centre of, and secured to the base A, is a screw-shaft, E, the upper end of which extends some distance above the top of the vat C.

On the screw-shaft E is a nut, F, provided with mortises, to receive the inner ends of the arms G.

On the under side of the nut F are rollers R, journalled in lugs, in plates h, which may be secured to the nut by screws, or the lugs may be cast or formed with the nut.

K is a nurse, in the centre of which is an opening large enough to admit the screw-shaft E, and around which opening is an annular plate, P, which is secured to the nurse K, and forms a bearing-surface for the rollers R.

Near the ends of the nut F are hooks I, which are attached to the nut by staples, so as to hang loosely, the points of the nuts being turned in opposite directions.

Near the ends of the nurse K are eyes J, with which, at certain times, the hooks I I engage.

M N are pressing-blocks, which, when placed in position, fill the space between the screw-shaft E and the staves of the vat C.

L L are blocks, or bars, which are placed between the nurse and the uppermost pressing-block.

The nut, nurse, bars, and pressing-blocks may be made of either wood or metal. The pressing-blocks may be solid pieces, with holes in the centre for the screw-shaft to pass through, or each block may consist of two semicircular pieces, in which latter case they should be placed so as to break joints at right angles.

The operation is as follows:

The fruit, or other substance to be pressed is placed in the vat C, and the pressing-block N laid upon it. The block M is then placed upon the block N, the bars L L upon the block M, and the nurse K upon the bars L L. The nut F is then placed upon the screw-shaft E, and screwed down by means of the arms G.

As the rollers R come in contact with the bearing-plate P, the nurse K is forced down upon the bars L L and blocks M N, pressing the fruit, or other substance contained in the vat C, and extracting the juice which escapes through the openings c, between the staves and the perforations b, in the disk B, running down into the annular groove g, and passing off by the spout s.

The relative position of the parts is such, that when the nut F is being screwed down, only the rear portions of the hooks I come in contact with the eyes J, and the hooks slip over the eyes without engaging with them.

When it is desired to add more fruit, or other substance to be pressed, or to put in additional pressing-blocks, the motion of the nut is reversed, relieving the nurse K from the pressure of the rollers, and, as the reverse motion is continued, the hooks I engage with the eyes J, and lift the nurse K from the bars L L, raising it above the vat, and holding it in the position shown in red lines in fig. 2.

When the desired quantity of fruit, or other substance has been placed in the vat, or the desired number of blocks or bars added, the nut is again screwed down until the nurse K comes in contact with the bars L L, when the hooks I are disengaged from the eyes J, and the rollers R, are brought to bear upon the plate P, forcing down the nurse and blocks, as hereinbefore described.

I am aware that screws, nuts, and followers have been used in wine and cider-presses, in a similar manner to that herein shown and described, and, therefore, I do not claim them broadly; but having thus fully described my invention,

What I claim as new therein, and desire to secure by Letters Patent, is—

The arrangement herein described of the nut F, provided with rollers R, arms G, and hooks I, in combination with the nurse K and eyes J, all constructed as and for the purpose set forth.

JACOB MAERHOFFER.

Witnesses:
F. W. LUDWIG,
THOS. WIDDICOMBE.